(12) United States Patent
Cook

(10) Patent No.: US 7,355,298 B2
(45) Date of Patent: Apr. 8, 2008

(54) SYPHON WAVE GENERATOR

(76) Inventor: Glen Edward Cook, 89 Prospect St., Simpson, PA (US) 18407

( * ) Notice: Subject to any disclaimer, the term of this patent is extended or adjusted under 35 U.S.C. 154(b) by 0 days.

(21) Appl. No.: 11/639,738

(22) Filed: Dec. 15, 2006

(65) Prior Publication Data

US 2007/0222222 A1    Sep. 27, 2007

Related U.S. Application Data

(60) Provisional application No. 60/782,887, filed on Mar. 17, 2006.

(51) Int. Cl.
*F03D 13/12* (2006.01)
*B63B 21/52* (2006.01)

(52) U.S. Cl. .......................... 290/53; 290/54

(58) Field of Classification Search .................. 290/53; 60/398
See application file for complete search history.

(56) References Cited

U.S. PATENT DOCUMENTS

| | | | | |
|---|---|---|---|---|
| 1,448,029 A | * | 3/1923 | Larry et al. ..................... 440/9 |
| 1,523,031 A | * | 1/1925 | Mitchell Jr. .................. 417/333 |
| 1,763,191 A | * | 6/1930 | Sealy et al. ................... 417/333 |
| 3,064,137 A | * | 11/1962 | Corbett, Jr. et al. .......... 290/53 |
| 3,569,725 A | * | 3/1971 | Rosenberg ..................... 290/53 |
| 3,870,893 A | * | 3/1975 | Mattera ......................... 290/53 |
| 3,912,938 A | * | 10/1975 | Filipenco ...................... 290/53 |
| 4,138,845 A | * | 2/1979 | Kitabayashi ................... 60/325 |
| 4,258,269 A | * | 3/1981 | Tsubota ......................... 290/53 |
| 4,271,668 A | * | 6/1981 | McCormick ................... 60/398 |
| 4,281,257 A | * | 7/1981 | Testa et al. .................... 290/42 |
| 4,286,347 A | * | 9/1981 | Modisette ...................... 60/398 |
| 4,341,959 A | * | 7/1982 | Ambli ........................... 290/53 |
| 4,383,413 A | * | 5/1983 | Wells ............................. 60/497 |
| 4,425,510 A | * | 1/1984 | Jury ............................... 290/42 |
| 4,441,316 A | * | 4/1984 | Moody .......................... 60/398 |
| 4,622,473 A | * | 11/1986 | Curry ............................ 290/53 |
| 4,719,754 A | * | 1/1988 | Nishikawa .................... 60/501 |
| 4,914,915 A | * | 4/1990 | Linderfelt ...................... 60/502 |
| 5,005,357 A | * | 4/1991 | Fox ................................ 60/398 |
| 5,186,822 A | * | 2/1993 | Tzong et al. ................ 210/122 |
| 5,374,850 A | * | 12/1994 | Cowen .......................... 290/53 |
| 5,507,943 A | * | 4/1996 | Labrador ..................... 210/136 |
| 5,770,893 A | * | 6/1998 | Youlton ......................... 290/53 |
| 5,872,406 A | * | 2/1999 | Ullman et al. ................ 290/53 |
| 6,216,455 B1 | * | 4/2001 | Doleh et al. ................... 60/398 |
| 6,574,957 B2 | * | 6/2003 | Brumfield ..................... 60/398 |
| 6,930,406 B2 | * | 8/2005 | Montgomery ................ 290/42 |
| 2004/0160060 A1 | * | 8/2004 | Montgomery ................ 290/11 |
| 2007/0130929 A1 | * | 6/2007 | Khan et al. .................... 60/398 |

* cited by examiner

*Primary Examiner*—Julio Gonzalez
*Assistant Examiner*—Pedro J. Cuevas

(57) ABSTRACT

Disclosed is a syphon wave generator for generating electric power from a wave-driven water body in a fast, easy, inexpensive and efficient manner such that the unit has few moving part, is very inexpensive to build and maintain and can withstand storms. The syphon wave generator comprises: a horizontal pipe with one or more pipes at each end extending down below the water surface, a turbine and generator mounted inside the horizontal pipe and a means for filling the unit with water. The waves passing under the unit cause different water levels at different pipes creating a siphon. The water siphoning across the horizontal pipe spins the turbine and generator to create electricity.

3 Claims, 12 Drawing Sheets

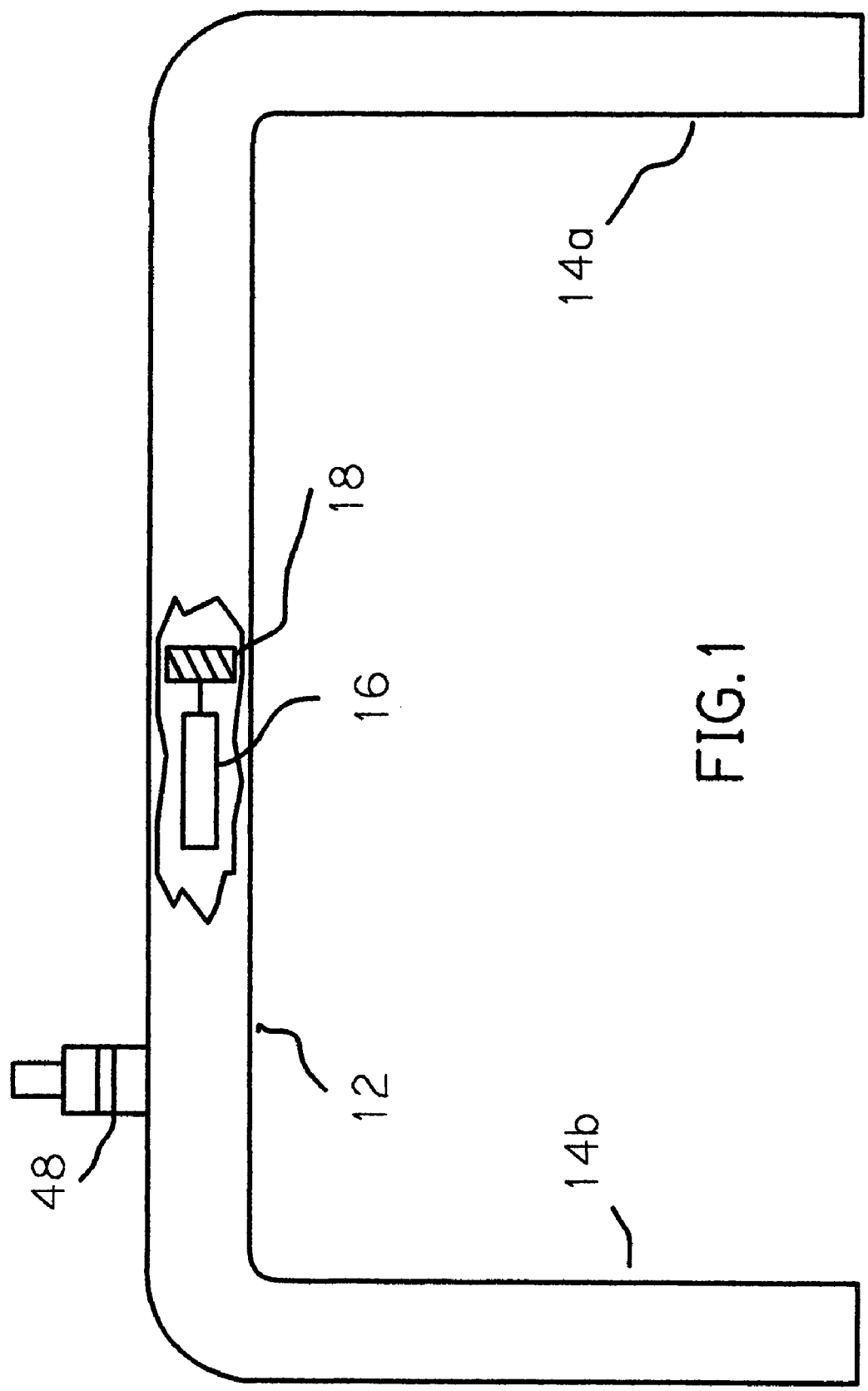

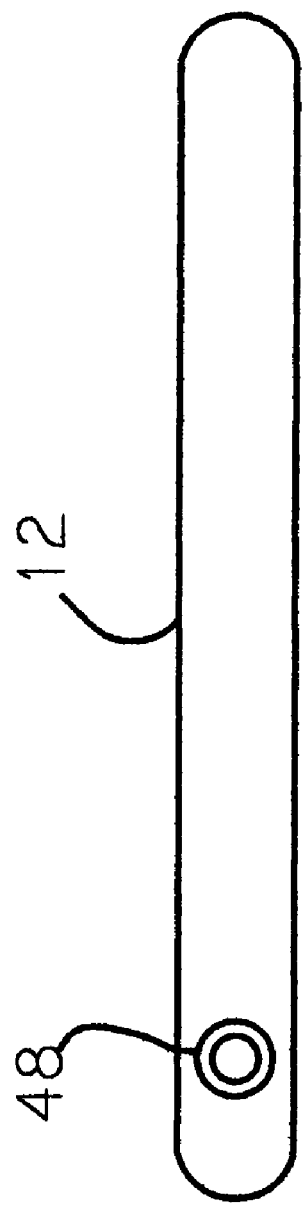
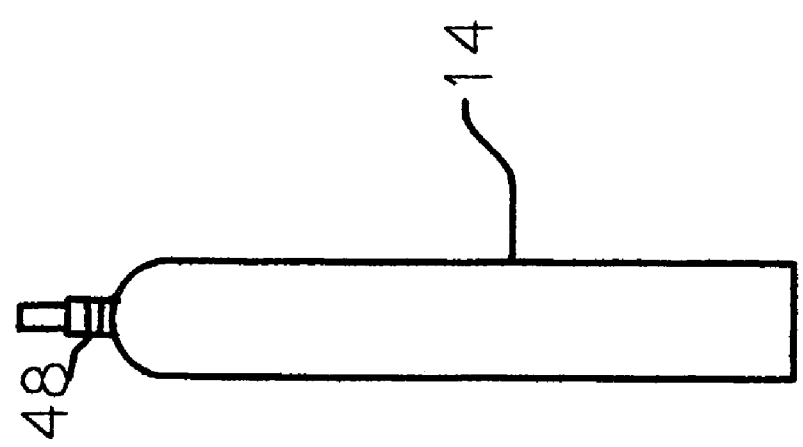
FIG. 3
FIG. 2

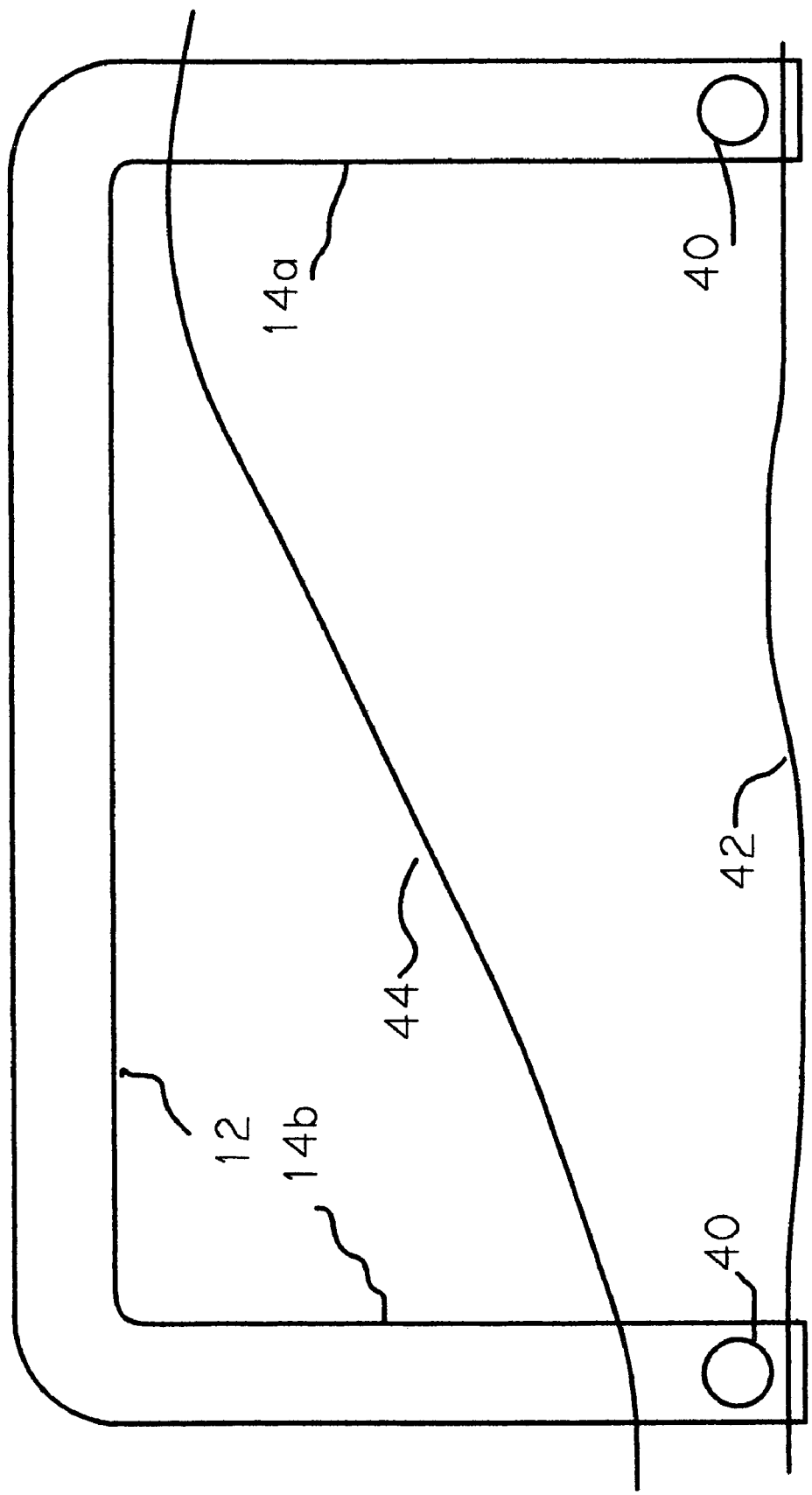

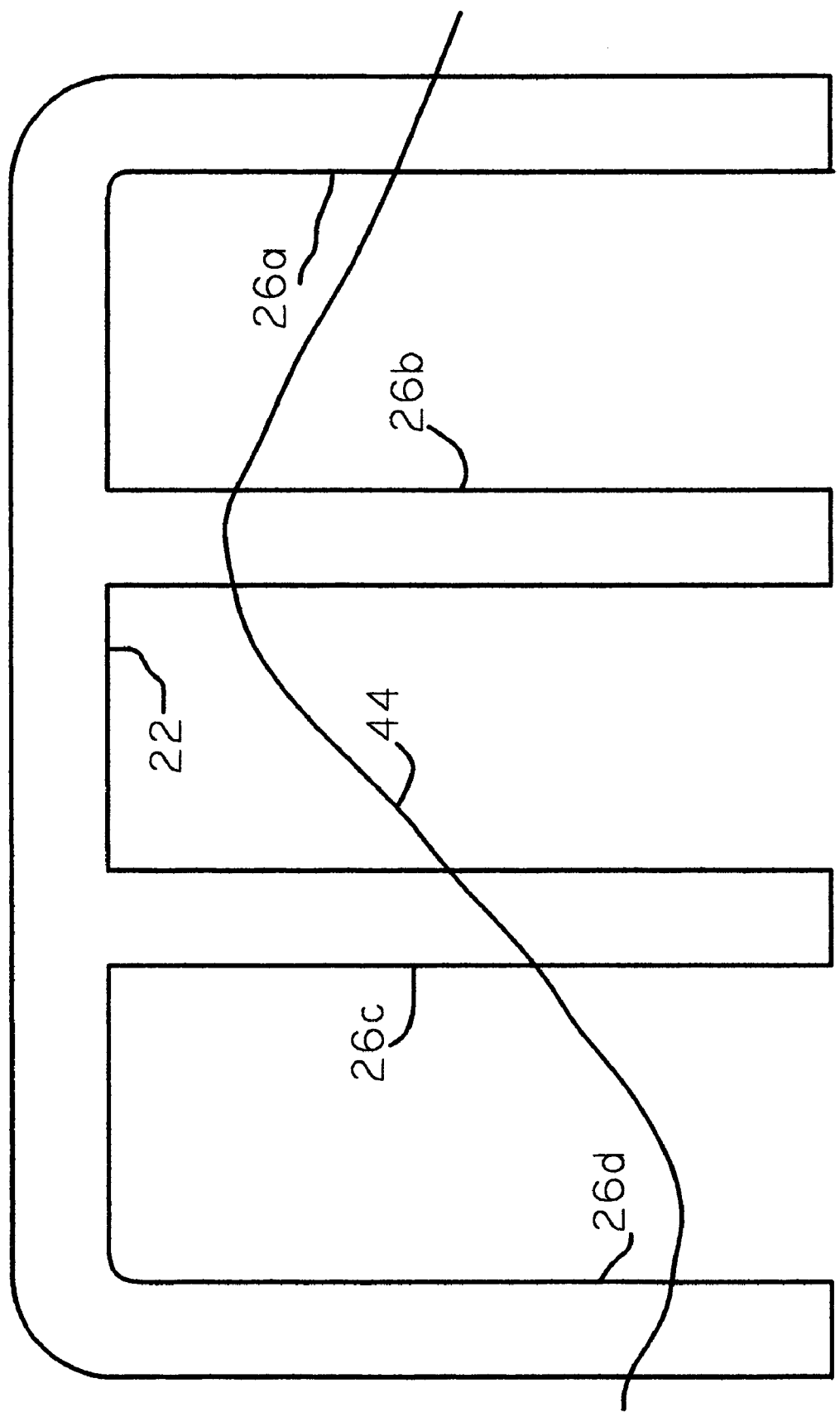

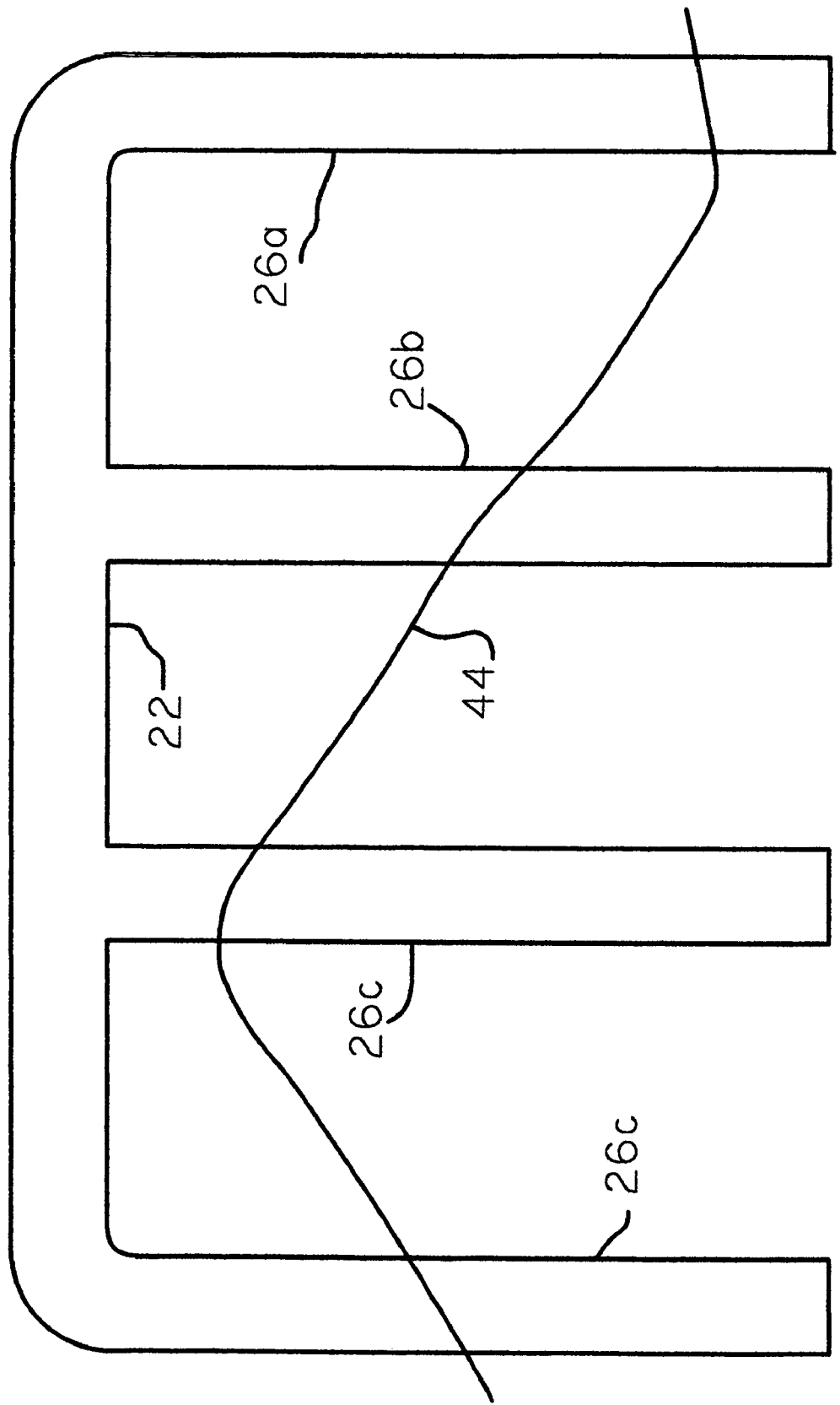

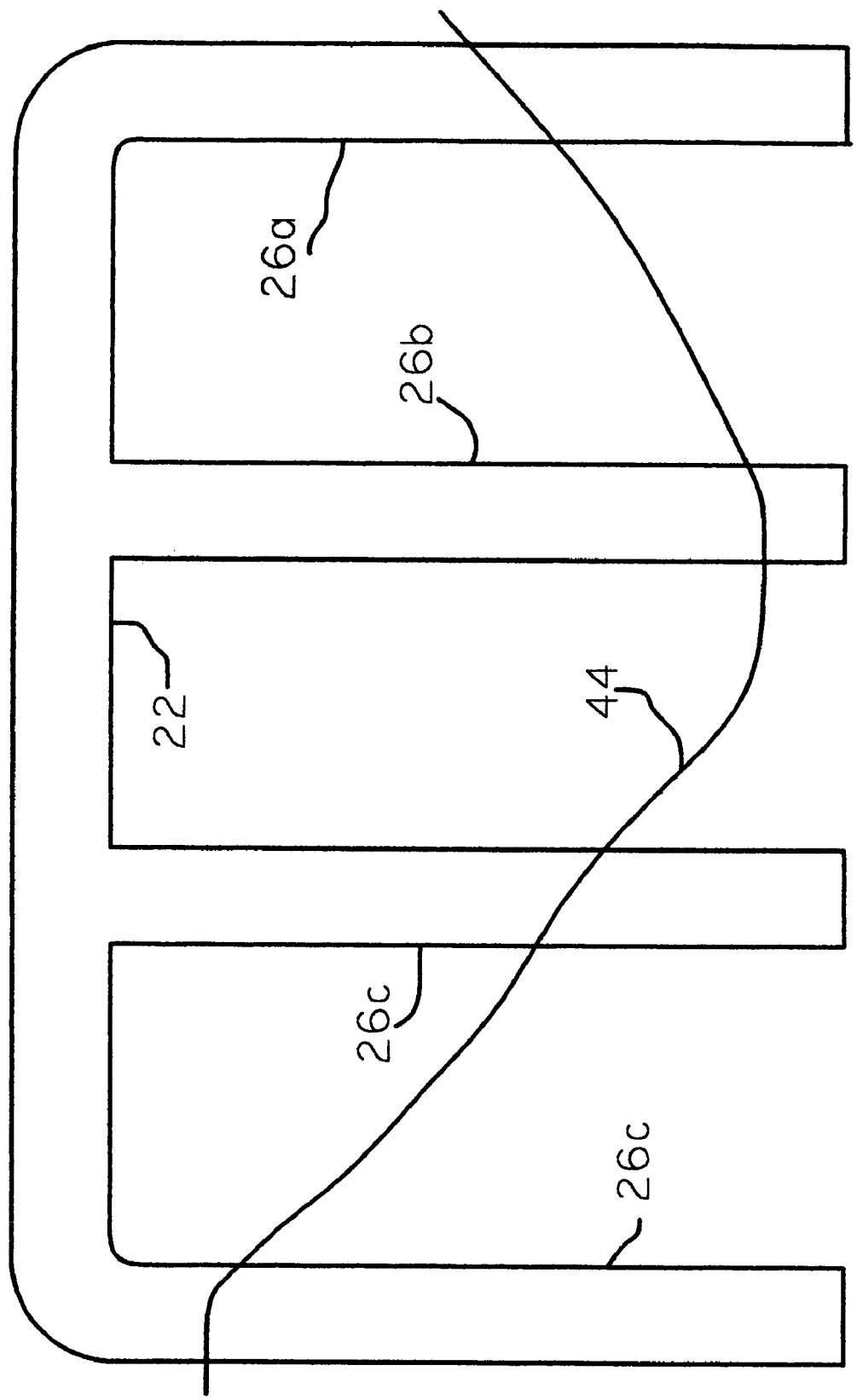

SYPHON WAVE GENERATOR

CROSS REFERENCE TO RELATED APPLICATION

This patent application is related to the U.S. Patent Application Ser. No. 60/782,887 dated Mar. 17, 2006 titled "Syphon Wave Generator." and assigned to the assignee of the present invention.

FEDERALLY SPONSORED RESEARCH

Not Applicable

SEQUENCE LISTING OR PROGRAM

Not Applicable

FIELD OF THE INVENTION

The present invention relates to a wave powered electric generating device using a siphon to move water through a turbine generator.

BACKGROUND OF THE INVENTION

Waves are a powerful source of solar power. The sun heats the earth causing the air near the ground to heat and rise creating wind. When the wind blows over a body of water the energy of the wind is exchanged to the waves it creates. The power of the waves is concentrated solar power. The power in the waves is both the movement of the waves and the lifting of the water to the crest of the waves.

Wave power plants extract the energy from the waves and convert this energy into useful electric power. The main advantages of extracting energy from waves are: firstly, the energy is solar with no pollution, and secondly, wave power is renewable and is a source of power great enough to power the world. However, the problems encountered by wave power stations are: first, most are costly to build in relation to the amount of electricity extracted, second, most generating devices are complex with numerous moving parts that experience great wear due to the salt and sand in the ocean often causing the cost of repair to exceed the value of the electricity extracted, and third, storms often destroy entire wave generating stations. Thus, There are few wave power generating stations in use today.

Accordingly, to extract electricity in large amounts inexpensively and efficiently, what is needed is a strong system that can withstand storms and be such that the units are less complex with less part replacement and inexpensive to construct.

SUMMARY OF THE INVENTION

In view of the preceding disadvantages of other wave powered generating devices, the general purpose of the present invention is to provide an apparatus for generating electricity from ocean waves by converting the energy from the wave height into electricity while overcoming the problems inherent in other units.

In one aspect, the present invention provides a syphon wave generator device comprising: a horizontal pipe mounted above the highest normal wave at high tide containing a prop driven generator mounted inside the horizontal pipe and at least two vertical pipes, at least one at each end of the horizontal pipe. Each vertical pipe must extend below the water surface at all times with openings in the vertical pipes under the water surface.

All the air must be removed from the pipe by any means including but not limited to: flipping the unit upside down, opening a service valve in the top pipe and lowering the unit completely under water until all the air is removed then closing the service valve and raising the unit, or preferably by using a service valve located at the top of the unit that can be attached to a pump to pump all the air out of the unit thus filling the unit completely with water.

When the crest of a wave is at the first vertical pipe the water level will be higher at that pipe than the second vertical pipe, thus the water will start flowing up the first vertical pipe at the crest of the wave, through the horizontal pipe turning the prop and generator, thus producing electricity, then flowing down the second vertical pipe due to the siphon effect. When the crest of the wave moves to the second vertical pipe the water level is higher at the second vertical pipe than the first vertical pipe. This will cause the water to flow up the second vertical pipe through the horizontal pipe turning the generator in the opposite direction, generating electricity, and flowing down the first vertical pipe due to the siphon effect.

In another aspect, the present invention provides a siphon wave generating device comprising: a horizontal pipe mounted above the highest normal wave at high tide containing a prop driven generator mounted inside the horizontal pipe and two or more vertical pipes, at least one at each end of the horizontal pipe. Each vertical pipe must extend below the water surface at all times with openings in the vertical pipes under the water surface. All the vertical pipes shall be equipped with a one way valve mounted inside the pipe that is opened and closed by the flow of the water. Preferably all the valves shall settle to the closed position when there is no water attempting to flow. All the vertical pipes connected to one side of the horizontal pipe shall be intake pipes. The valves on these pipes would open when the water attempts to flow up the pipe thus allowing the flow of water up the vertical pipes, then close when the water attempts to flow down the pipe. This would stop the flow of water down and out the bottom of the intake pipes. All the vertical pipes connected to the other side of the horizontal pipe shall be exhaust pipes. The valves on these pipes would open when the water attempts to flow down the pipes thus allowing the flow of water down and out the pipes, then close when the water attempts to flow up the pipes. This would stop the flow of water up into the horizontal pipe.

The valves in the intake and exhaust pipes would jointly cause the water to flow in only one direction through the horizontal pipe, from the intake side to the exhaust side. This would cause the generator to turn in only one direction.

All the air must be removed from the pipe by any means, preferably by using a service valve located at the top of the unit that will attach to a pump to pump all the air out of the unit.

When the crest of a wave is at the first vertical intake pipe the water level will be higher at that pipe than any other vertical intake pipe, thus the water will start flowing up the first vertical pipe at the crest of the wave. The one way valves in the other intake pipes would prevent the water from flowing out thus forcing the water to flow through the horizontal generating pipe turning the prop and generator, thus producing electricity. The water would then flow down any of the exhaust pipes in which the water height outside the exhaust pipe is below the height of the water outside the first intake pipe due to the siphon effect.

When the crest of the wave moves to the second intake pipe the water level is higher at the this pipe than any other intake pipe causing the water to flow up this pipe through the horizontal pipe turning the generator in the same direction, generating electricity and flowing down the exhaust pipe closest to the trough of the wave due to the siphon effect.

BRIEF DESCRIPTION OF THE DRAWINGS

The advantages and features of the present invention will become better understood with reference to the following more detailed description and claims taken in conjunction with the accompanying drawings, wherein like elements are identified with like symbols, and in which:

FIG. 1 is a side view of a syphon wave generator with one horizontal pipe and two vertical pipes, a service valve and a cutaway of the internal generator and turbine;

FIG. 2 is an end view of a syphon wave generator with one horizontal pipe, two vertical pipes and a service valve;

FIG. 3 is a top view of a syphon wave generator with one horizontal pipe, two vertical pipes and a service valve;

FIG. 4 is a side view of a syphon wave generator with one horizontal pipe and two vertical pipes extending down into the ocean floor for mounting with intake/exhaust openings in the vertical pipes below the water surface and a wave with the crest at the right vertical pipe;

FIG. 11 is a side view of the intake side of a one direction syphon wave generator with the crest of the wave at intake pipe (26*b*) and the trough of the wave at exhaust pipe (46*d*);

FIG. 12 is a side view of the intake side of a one direction syphon wave generator with the crest of the wave at intake pipe (26*c*) and the trough of the wave at exhaust pipe (46*a*);

FIG. 13 is a side view of the intake side of a one direction syphon wave generator with the crest of the wave at intake pipe (26*d*) and the trough of the wave at exhaust pipe (46*b*).

DRAWINGS—REFERENCE NUMERALS

Figure 5:
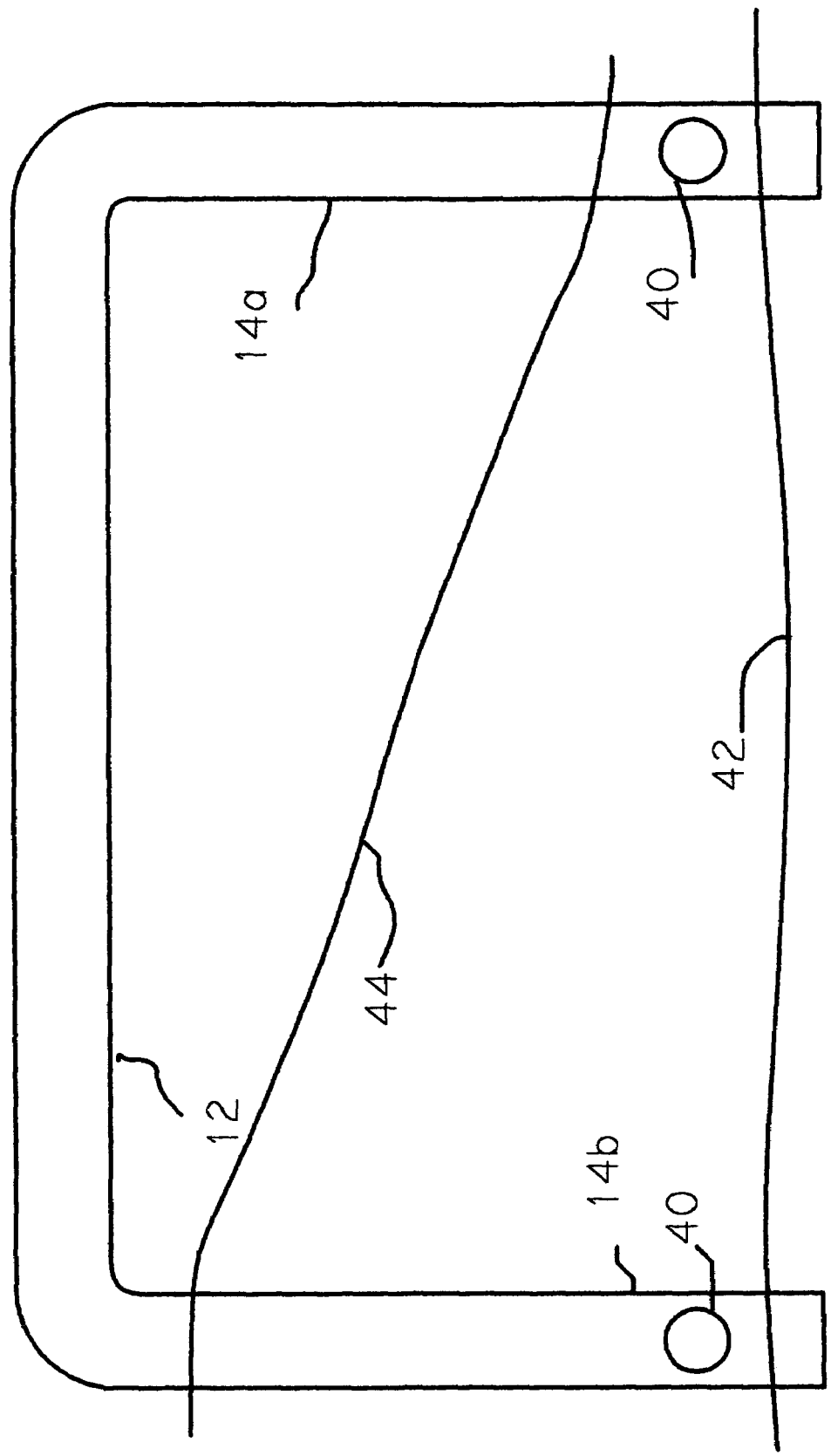
FIG. 5 is a side view of a syphon wave generator with one horizontal pipe and two vertical pipes extending down into the ocean floor for mounting with intake/exhaust openings in the vertical pipes below the water surface and a wave with the crest at the left vertical pipe.

| 12 | horizontal generator pipe | 14 | vertical inlet/outlet pipe |
|----|---------------------------|----|----------------------------|
| 16 | generator                 | 18 | turbine                    |
| 22 | intake manifold           | 24 | exhaust manifold           |
| 26 | vertical intake pipe      | 28 | intake valve               |
| 30 | exhaust valve             | 32 | valve disc                 |
| 34 | valve shaft               | 36 | valve lip                  |
| 38 | valve weight              | 40 | inlet/outlet opening       |
| 42 | ocean bottom              | 44 | wave/waterline             |
| 46 | vertical exhaust pipes    | 48 | service valve              |

DETAILED DESCRIPTION OF THE INVENTION

The examples described are subject to many variations in structure and design. It should be emphasized that the present invention is not limited to a particular syphon wave generator as shown. The size of the units along with the number of vertical pipes, along with the spacing between them, should be determined by the size and spacing of the waves at the location the unit will be used.

The two syphon wave generators described are first: a basic simple unit and second: a more complex unit. The description of the first unit shows the basic principal that allows the siphon to work. This basic principal is the bases for both units. The second unit uses the same principals with added features including one way valves and a plurality of pipes which greatly increase the amount of power extracted. This unit is able to produce a constant flow of power. Both units could be used as a single unit; however, both are best when used in a group or field of syphon generators.

Whenever I speak of "water height" I am referring to the height of the water outside the syphon generator. The height or level of the water inside the generator is always the same, full, as there can be no air inside the generator pipes.

FIG. 1 illustrates a basic syphon wave generator with one horizontal generator pipe (12) and two vertical inlet/outlet pipes (14). FIG. 1 shows a cutout view of the generator (16) and turbine (18) inside the horizontal generator pipe (12). The generator pipe (12) may have an enlarged diameter to prevent a restriction in water flow. Both vertical inlet/outlet pipes (14) must have openings under the water surface. A service valve (48) in mounted on the top to remove the air and fill the unit with water. This valve could be of many types. A simple valve as one used on auto tire will work well.

FIG. 2 is an end view of a basic unit with one horizontal generator pipe (12), one vertical inlet/outlet pipe (14) on each end of the generator pipe (12) and a service valve (48) on top.

FIG. 3 is a top view of a basic unit with one horizontal generator pipe (12), one vertical inlet/outlet pipe (14) at each end of the horizontal generator pipe (12) and a service valve (48) at the top.

FIG. 4 illustrates a basic syphon wave generator mounted on the ocean floor (42) with vertical inlet/outlet pipes (14) extended down into the ocean floor (42) for mounting the unit. This method of mounting the syphon generator to the ocean floor (42) is the preferred method for mounting all units when the water depth allows it. The horizontal generating pipe (12) must be as perpendicular to the oncoming waves as possible. The pipes can be made of metal, plastic, cement or many other materials or combinations of materials. A metal or cement pipe with a PVC lining would work well. The generator (16) and turbine (18) could be the same or similar to the units used in modern hydroelectric power plants today. FIG. 4 also illustrates the inlet/outlet openings (40) above the ocean floor (42) but always below the wave/waterline (44). The inlet/outlets openings (40) should be protected from fish and other objects entering the generator with a screen (not shown). The wave/waterline (44) shows the crest of the wave near the top of the vertical pipe (14a) on the right and the trough of the wave/waterline (44) at the left vertical pipe (14b).

FIG. 5 illustrates a basic syphon wave generator just like FIG. 4 except the wave/waterline (44) has moved. In FIG. 5 the crest of the wave is near the left vertical inlet/outlet pipe (14b) while the trough is near the right vertical inlet/outlet pipe (14a).

Figure 6:
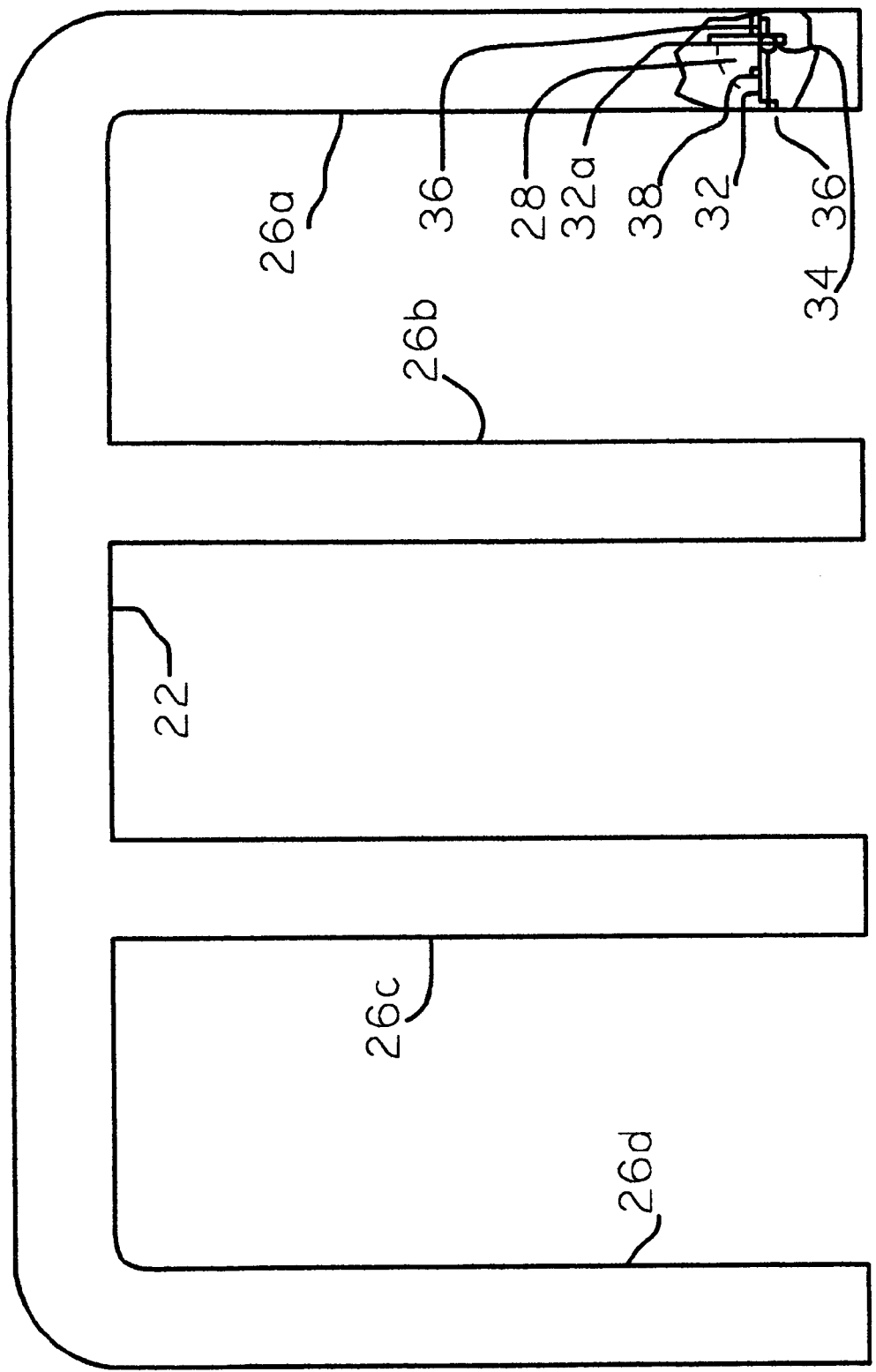
FIG. 6 is a side view of the intake side of a one direction syphon wave generator with a horizontal generator pipe, one horizontal intake manifold, one horizontal exhaust manifold, four vertical intake pipes and four vertical exhaust pipes with one way valves mounted in each vertical pipe.

FIG. 6 illustrates a side view of the intake side of a one direction syphon wave generator with four vertical intake pipes and four vertical exhaust pipes. The unit also comprises one horizontal generator pipe (12), one intake manifold (22) and one exhaust manifold (24). This drawing also shows a cutaway of an intake valve (28) inside the vertical intake pipe (26a). The cutaway shows the valve disc (32) in both the open and closed position. There is only one disc (32) in each valve. There are intake valves (28) inside vertical intake pipes (26b), (26c) and (26d). These valves are not shown.

Figure 7:
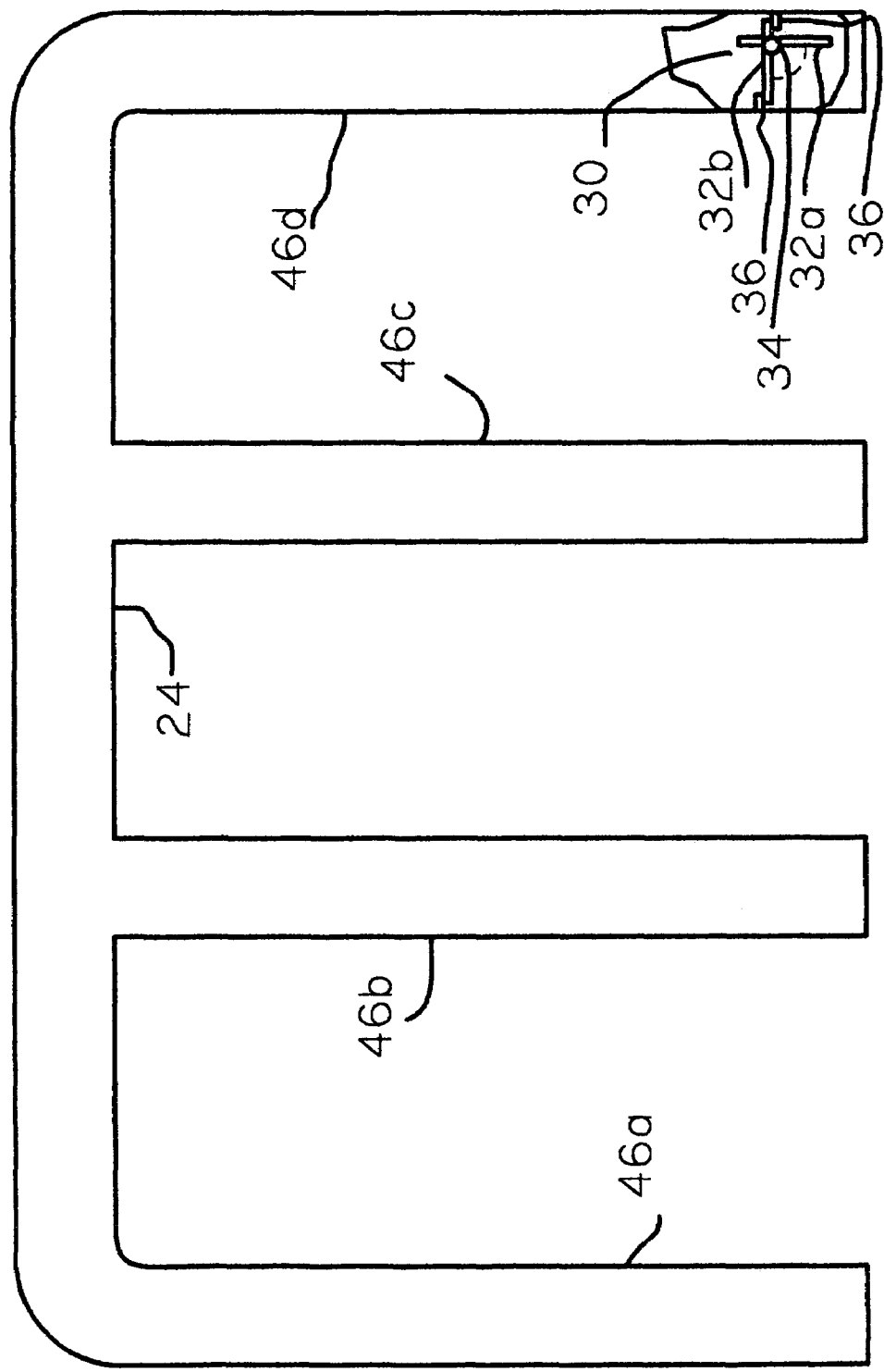
FIG. 7 is a side view of the exhaust side of a one direction syphon wave generator with a horizontal generator pipe, one horizontal intake manifold, one horizontal exhaust manifold and four vertical intake pipes and four vertical exhaust pipes with one way valves mounted in each vertical pipe.

FIG. 7 illustrates a side view of the exhaust side of a one direction syphon wave generator with four vertical intake pipes (26) and four vertical exhaust pipes (46). The unit also comprises one horizontal generator pipe (12), one intake manifold (22) and one exhaust manifold (24). This drawing also shows a cutaway of an exhaust valve (30) inside the vertical exhaust pipe (46d). The cutaway shows the valve disc (32a) in the open position and valve disc (32b) in a closed position. There is only one valve disc (32) in each valve and valve disc (32a) and (32b) are the same disc in different positions. There are exhaust valves (30) inside vertical exhaust pipes (46a), (46b) and (46c). These valves are not shown.

Figure 8:
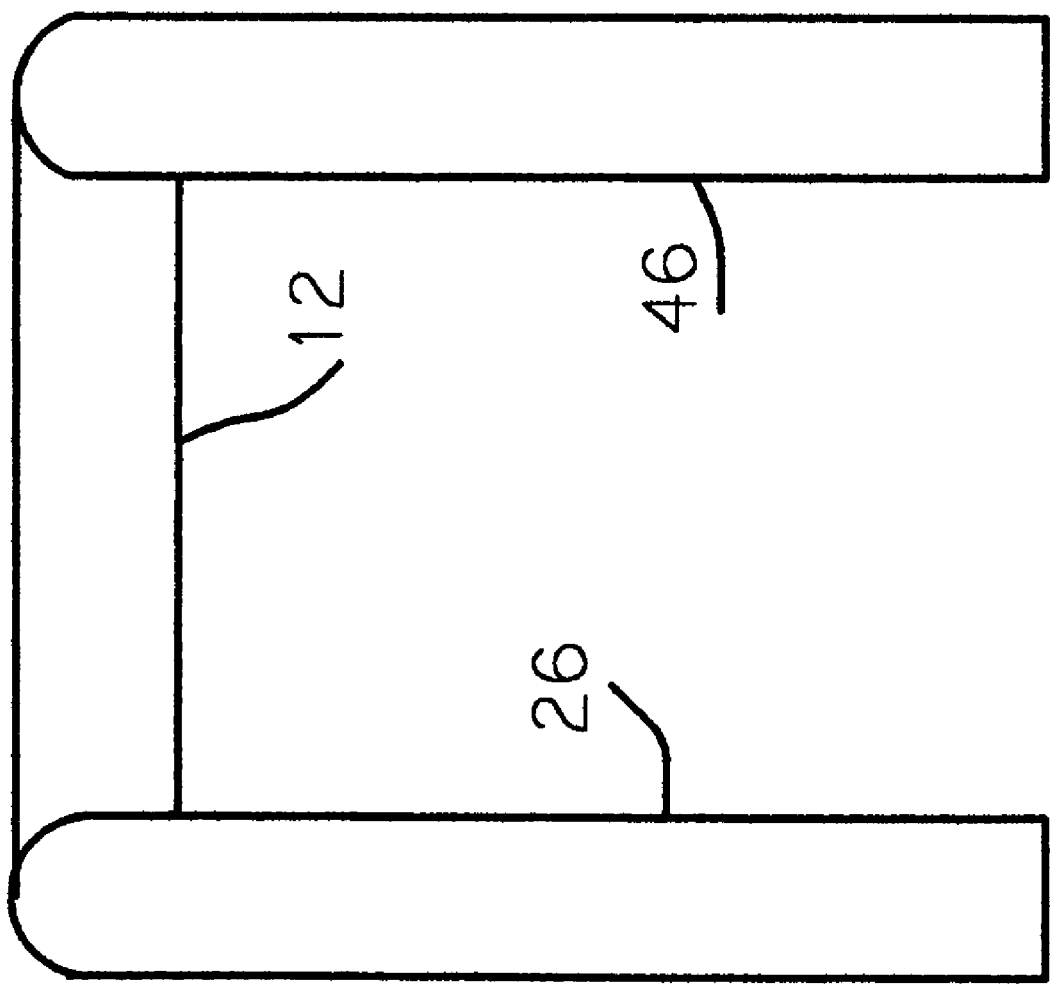
FIG. 8 is an end view of a one direction syphon wave generator with a horizontal generator pipe, one horizontal intake pipe, one horizontal exhaust pipe and four vertical intake pipes and four vertical exhaust pipes with one way valves mounted in each vertical pipe.

FIG. 8 illustrates an end view of a one direction syphon wave generator with the vertical intake pipe (26) on the left and the vertical exhaust pipe (46) on the right.

Figure 9:
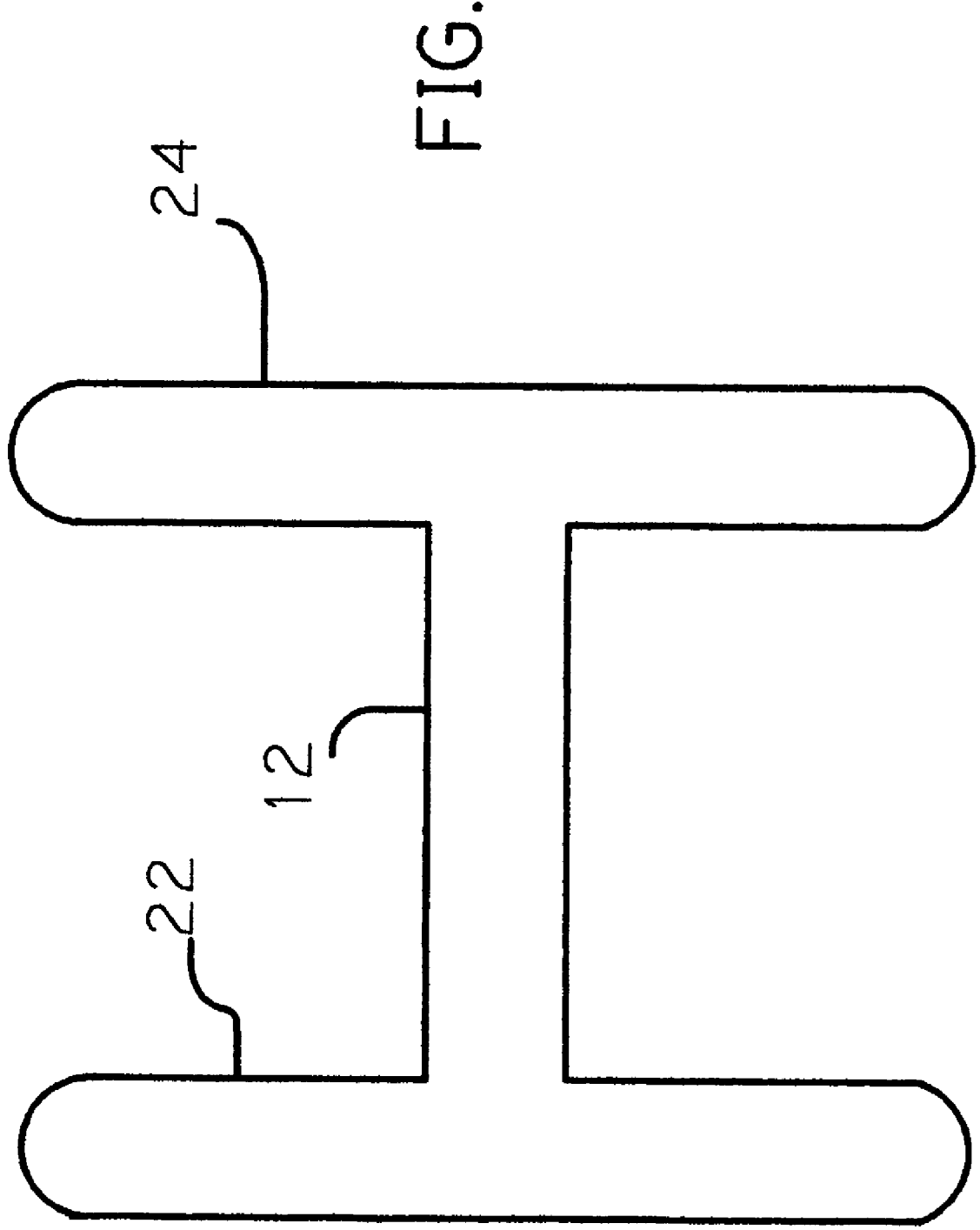
FIG. 9 is a top view of a one direction syphon wave generator with a horizontal generator pipe, one horizontal intake manifold, one horizontal exhaust manifold, four vertical intake pipes and four vertical exhaust pipes with one way valves mounted in each vertical pipe.

FIG. 9 illustrates a top view of a one direction syphon wave generator with the intake manifold (22) on the left and the exhaust manifold (24) on the right.

Figure 10:
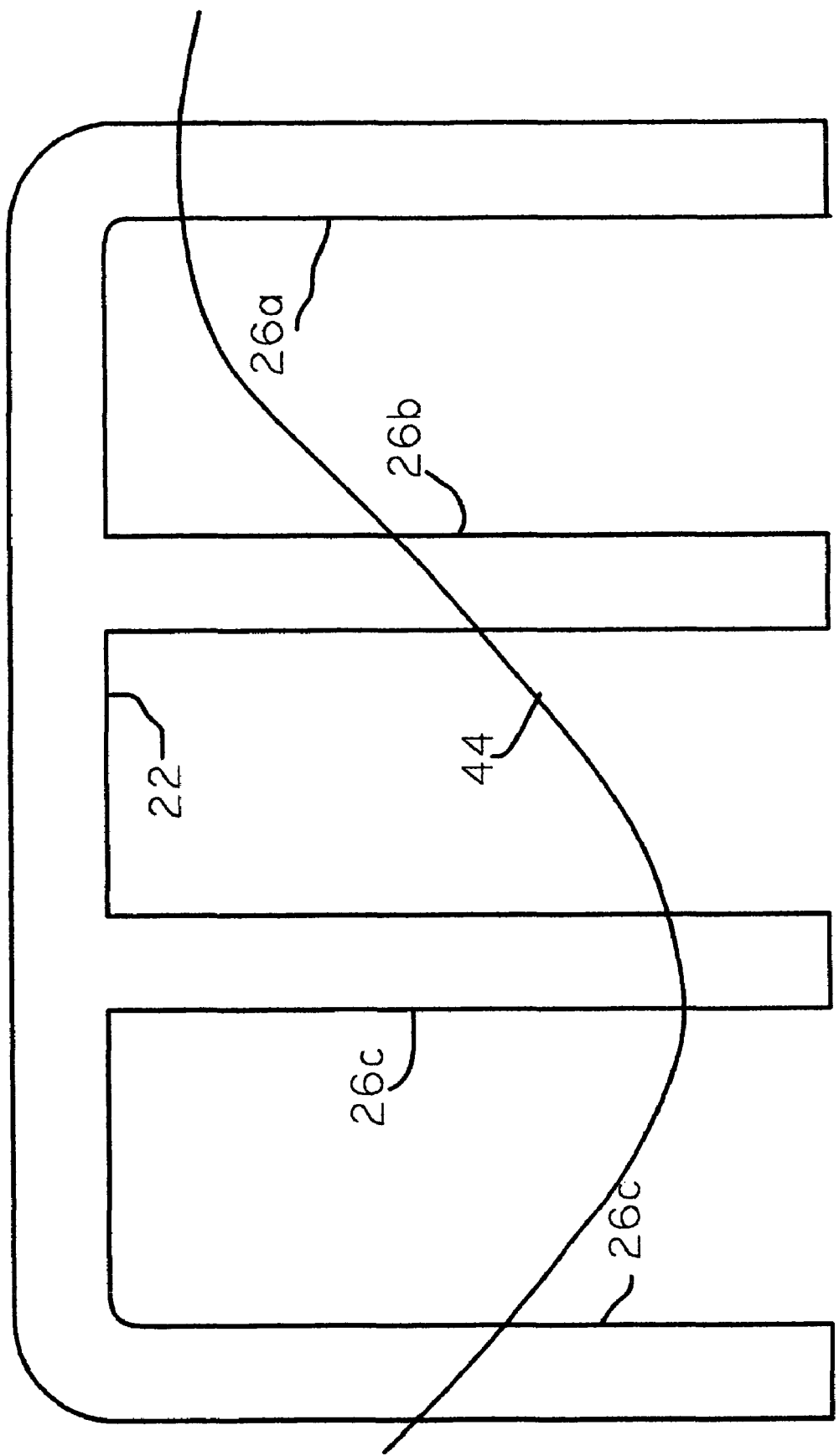
FIG. 10 is a side view of the intake side of a one direction syphon wave generator with the crest of the wave at intake pipe (26*a*) and the trough of the wave at exhaust pipe (46*c*)

FIG. 10 illustrates a side view of the intake side of a one direction syphon wave generator with four vertical intake pipes and four vertical exhaust pipes. The unit also comprises one horizontal generator pipe (12), one intake manifold (22) and one exhaust manifold (24). There are intake valves (28) inside vertical intake pipes (26). These valves are not shown. The wave/waterline (44) shows the wave crest at intake pipe (26a) and the trough at exhaust pipe (46c). The exhaust pipe (46c) is directly behind intake pipe (26c).

FIG. 11 illustrates a side view of the intake side of a one direction syphon wave generator with four vertical intake pipes and four vertical exhaust pipes. The unit also comprises one horizontal generator pipe (12), one intake manifold (22) and one exhaust manifold (24). There are intake valves (28) inside vertical intake pipes (26). These valves are not shown. The wave/waterline (44) shows the wave crest at intake pipe (26b) and the trough at exhaust pipe (46d). The exhaust pipe (46d) is directly behind intake pipe (26d).

FIG. 12 illustrates a side view of the intake side of a one direction syphon wave generator with four vertical intake pipes and four vertical exhaust pipes. The unit also comprises one horizontal generator pipe (12), one intake manifold (22) and one exhaust manifold (24). There are intake valves (28) inside vertical intake pipes (26). These valves are not shown. The wave/waterline (44) shows the wave crest at intake pipe (26c) and the trough at exhaust pipe (46a). The exhaust pipe (46a) is directly behind intake pipe (26a).

FIG. 13 illustrates a side view of the intake side of a one direction syphon wave generator with four vertical intake pipes and four vertical exhaust pipes. The unit also comprises one horizontal generator pipe (12), one intake manifold (22) and one exhaust manifold (24). There are intake valves (28) inside vertical intake pipes (26). These valves are not shown. The wave/waterline (44) shows the wave crest at intake pipe (26d) and the trough at exhaust pipe (46b). The exhaust pipe (46b) is directly behind intake pipe (26b).

Operation of a Basic Syphon Wave Generator

The operation of the syphon wave generator is based on the siphon. It has been thought, a siphon can not work in a single body of water because there is only one water level and a siphon only moves water from one level to a lower level. When we look at waves in the ocean we see the crests of the waves are at a higher level than the trough. The forces of the wave hold the water at different levels almost as if they were in different containers. The syphon wave generator siphons the water from the high crest of the waves to the lower trough of the wave as if they were in different containers or as if there was a wall dividing them. There is a wall, the forces of the wave. The syphon wave generator does not use the force of the wave but uses the weight of the water at the crest and drops it to the trough just as a hydroelectric power plant takes the water at the top of the dam and drops it through a turbine generator to a lower level.

The waves are always moving so we must look at the waves at different times. To better explain what is happening we will stop the wave at different points to show what is happening at different stages.

The syphon wave generators may have two or more vertical inlet/outlet pipes (14) or vertical intake pipes (26) and vertical exhaust pipes (46). The units with only two vertical inlet/outlet pipes (14) do not need valves as the water will flow back and forth through the units. Units with more than a total of four vertical intake pipes (26) and vertical exhaust pipes (46) are best if equipped with inlet and outlet valves so the water will flow in only one direction. I will first explain a basic two vertical inlet/outlet pipe syphon wave generator.

In one aspect looking at FIG. 4 we see a basic syphon wave generator mounted in the ocean floor (42). Before operating all the air must be removed from inside the generator. The best way to remove the air is to connect a self priming pump to a service valve (47) in FIG. 1 at the highest part of the generator. This pump (not shown) could be temporarily connected or permanently mounted to the unit with a manually operated switch or with a float type switch. An automatic float switch would be recommended in locations where air might enter the unit.

In FIG. 4 we see the crest of the wave/waterline (44) is at the right vertical inlet/outlet pipe (14a). The water height at the right vertical inlet/outlet pipe (14a) is higher than the water level at the left vertical inlet/outlet pipe (14b). This will cause the water in the left vertical inlet/outlet pipe (14b) to fall pulling water up the right inlet/outlet pipe (14a) and through the horizontal generating pipe (12). This water flow will spin the turbine (18) and generator (16) producing electricity. The water will continue flowing until the wave moves so the water level is equal at both vertical inlet/outlet pipes (14a) and (14b).

In FIG. 5 we see the wave/waterline (44) has moved. The crest of the wave is now at the left vertical inlet/outlet pipe (14b). The trough is at the right vertical inlet/outlet pipe (14a). The water level is lower at the right vertical inlet/outlet pipe (14a) causing the water to fall and flow down and out the right vertical inlet/outlet pipe (14a) pulling water up the left vertical inlet/outlet pipe (14b) through the horizontal generator pipe (12) spinning the turbine (18) and generator (16) in the opposite direction generating electricity.

As the waves move from the right to the left passing under the syphon wave generator the water will flow back and forth through the pipes generating electricity.

To better explain and make all aspects of the operation more clear I will explain the operation explained above in a different way using different examples.

Looking at FIG. 4 we see a basic syphon wave generator with two vertical inlet/outlet pipes (14a) and (14b). The unit is mounted into the ocean floor (42). All the air has been removed from the unit so the unit is completely filled with water. The water is held in the unit the same way the water in a water cooler bottle is held in when the water cooler bottle is turned upside down. If no air is allowed to enter the bottle the water cannot escape. The water inside the syphon wave generator is under negative pressure. If we made a hole in the horizontal generator pipe (12) the water would not flow out the hole. Air would flow into the hole as the water would flow out the bottom of vertical pipe (14a) and (14b).

We see in FIG. 4 the wave/waterline (44) is near the top of vertical inlet/outlet pipe (14a) and near the bottom of vertical pipe (14b). All the water below the water line is weightless as it is under water. If we take a plastic container and fill it completely with water and pushed it underwater it would hang in the water. When we lift the container out of the water the container would weigh much more than the air around it. If we let go of the container it would fall into the water with great force. This force is the power the syphon wave generator is converting into electricity.

Looking at vertical inlet pipe (14a) in FIG. 4 we see there is only a small amount of water above the wave/waterline (44) compared to the amount of water above the wave/waterline (44) at the vertical inlet/outlet pipe (14b). This means the weigh of the water inside vertical inlet/outlet pipe (14b) above the wave/waterline (44) weights much more than the water above the wave/waterline (44) at the vertical inlet/outlet pipe (14a). This will cause the water in vertical inlet/outlet pipe (14b) to fall like a liquid sea-saw. As the water flows down and out the bottom of the vertical inlet/outlet pipe (14b), water will be pulled or sucked up the vertical inlet/outlet pipe (14a), through the horizontal generator pipe (12) spinning the turbine (18) and the generator (16) creating electricity. The water will continue to flow until the wave moves to the left and the water level at vertical inlet/outlet pipes (14a) and (14b) are equal.

When the crest of the wave is at vertical inlet/outlet pipe (14b) as seen in FIG. 5, the water will fall and flow down the vertical inlet/outlet pipe (14a). This will pull the water up the vertical inlet/outlet pipe (14b), through the horizontal generator pipe (12) spinning the turbine (18) and the generator (16) in the opposite direction producing electricity. This action will continue back and forth as the waves pass under the syphon wave generator.

In another aspect the syphon wave generator with two or more vertical inlet pipes and two or more vertical outlet pipes with valves inside the pipes would be a one direction syphon wave generator. A one direction syphon wave generator would let the water flow through the generator pipe in only one direction. The following description is of a one direction syphon wave generator with four vertical inlet pipes and four vertical outlet pipes. The vertical inlet pipes will be referred to as intake pipes and the vertical outlet pipes will be referred to as exhaust pipes.

In FIG. 6 we see the intake side of a syphon wave generator with a cutaway of an intake valve (28) on intake pipe (26a). Every intake pipe (26) will have an intake valve (28) inside. The horizontal intake manifold (22) connects all the intake pipes (26). Looking at the intake valve (28) in the cutaway, we see the valve disc (32) in the closed position. It is a flat circle slightly smaller than the inside diameter of the intake pipe (26). (32a) is valve disc (32) in the open position. There is only one valve disc in each valve. The valve disk (32) has a valve shaft (34) to pivot on. This valve shaft (34) is off center so there is a greater surface area on one side of the valve disc (32) so the water flow will open the valve disc (32) without jamming. There are two valve lips mounted to the inside of the intake pipe to stop the valve disc in a closed position. These valve lips (36) also act as stops to keep the valve disc (32) from opening too far. The valve disc (32) cannot open all the way or the reverse flow would jam the valve in the open position. The valve disc should be weighted with a valve weight (38) FIG. 6 so when no water is flowing the valve disc (32) will settle to a closed position.

In FIG. 7 we see the exhaust side of a syphon wave generator with a cutaway of an exhaust valve (30) on intake pipe (46a). The exhaust valve (30) is the same as the intake valve (28) in FIG. 6 except that it is flipped upside down. The exhaust valve must be weighted to settle to the closed position when no water is flowing. Every exhaust pipe (46) will have an exhaust valve (30) inside. The horizontal exhaust manifold (24) connects all the intake pipes (46).

In FIG. 8 we see intake pipe (26a) on the left. Intake pipes (26b), (26c) and (26d) are directly behind intake pipe (26a). The exhaust pipe (46a) is on the right. Exhaust pipe (46b), (46c) and (46d) are directly behind exhaust pipe (46a). The generator pipe (12) connects the intake manifold (22) and exhaust manifold (24) as seen in FIG. 9.

FIG. 9 shows the generator pipe (12) perpendicular to the intake manifold (22) and the exhaust manifold (24) in an H pattern. The generator pipe (12) may connect to the intake manifold (22) and the exhaust manifold (24) at any point. The generator pipe (12) may be parallel to the intake pipe (22) and exhaust manifold (24) or slightly above. This will allow the intake manifold (22) and the exhaust manifold (24) and each of the intake pipes (26) and exhaust pipes (46) to be up against each other if desired. The intake manifold (22) and the exhaust manifold (24) should be parallel to each other and about perpendicular to the incoming waves.

In FIGS. 6, 10, 11, 12 and 13 we are looking at the intake side of the syphon wave generator. Directly in back of the intake pipe (26a) is exhaust pipe (46a). Directly in back of intake pipe (26b) is exhaust pipe (46b). Directly in back of intake pipe (26c) is exhaust pipe (46c) and directly in back of intake pipe (26d) is exhaust pipe (46d). This means when an incoming wave hits intake pipe (26a) it is also hitting exhaust pipe (46a) and so on.

In FIGS. 10, 11, 12 and 13 the intake pipes (26) are spaced so there is one intake pipe between the intake pipe at the crest of the wave and the intake pipe (26) at the trough of the wave. It would be best to have at least three intake pipes between the crest and trough of the wave. The same is true for the exhaust pipes (46).

In the following description using FIGS. 10, 11, 12 and 13 we are showing the intake valve (28) opening when the crest of the wave is at that pipe. The valve timing will overlap. When the crest of the wave is between intake pipe (26a) and (26b), both valves will be open. The same is true for the exhaust valves (46).

In FIG. 10 we see the crest of the wave/waterline (44) at intake pipe (26a) and the trough of the wave/waterline (44) at exhaust pipe (46c). This will cause the intake valve inside intake pipe (26a) to open and the exhaust valve inside exhaust pipe (46c) to open. All other valves would be basically closed. This would cause the water in exhaust pipe (46c) to fall pulling water up the intake pipe (26a), through the generator pipe (23), spinning the turbine (18) and generator (16) creating electricity and flowing out exhaust pipe (46c). The action of this generator would be the same as the basic syphon wave generator in FIG. 4 with intake pipe (26a) in FIG. 10 acting like vertical inlet/outlet pipe (14a) in FIG. 4. The exhaust pipe (46c) in FIG. 10 would be acting like inlet/outlet pipe (14b) in FIG. 4.

In FIG. 11 we see the wave/waterline (44) has moved and the crest of the wave is now at intake pipe (26b) and the trough is near exhaust pipe (46d). The water will now flow up intake pipe (26b), through the generator pipe (12) and down and out exhaust pipe (46d).

In FIG. 12 we see the wave/waterline has moved and the crest of the wave is now at intake pipe (26c) and the trough is near exhaust pipe (46a). The water will now flow up intake pipe (26c), through the generator pipe (12) and down and out exhaust pipe (46a).

In FIG. 13 we see the wave/waterline (44) has moved and the crest of the wave is now at intake pipe (26d) and the trough is near exhaust pipe (46b). The water will now flow up intake pipe (26d), through the generator pipe (12) and down and out exhaust pipe (46b).

At this point the crest of the next wave is at the intake pipe (26a) as in FIG. 10 and the operation is repeating itself.

What is happening is the intake pipes (26) are following the crest of the waves while the exhaust pipes (46) are following the trough of the waves. This will create a continuous flow of water through the generator pipe, spinning the turbine (18) and the generator (16) in one direction creating continuous electricity.

To estimate the amount of power the units will produce we can use the formula: Head X Flow X 9.81=Power. We then must deduct about 40% because of loss spinning the turbine, the generator and side wall drag. If we have two meter waves and our pipes are spaced so the height goes from two meters when the crest is at the intake pipes to one meter when the crest is between two intake pipes are head pressure would be about 1.5. I have determined through tests that an 81 centimeter pipe (32 inch) will flow over 3,750 liters per second. Using these figures we can estimate the power we can expect to produce with two meter waves using a one direction syphon wave generator with a 81 centimeter (32 inch) diameter, a 1.6 meter (64 inch) diameter and a 3.25 meter (128 inch) diameter:

A 0.81 meter diameter 1.5×3750=5,625×9.81=55,181 watts.
A 1.6 meter diameter: 1.5×18,750=28,125×9.81=275,906 watts.
A 3.25 meter diameter: 1.5×93750=140,625×9.81=1,379,531 watts After deducting about 40% to compensate for power loss converting the power into electricity. We can round these figures out to:

A 0.81 meter syphon generator would produce about 30 kilowatts.
A 1.6 meter syphon wave generator would produce about 165 kilowatts.
A 3.25 meter syphon wave generator would produce about 800 kilowatts.

A two meter syphon wave generator should average more than one forth megawatt with normal waves ranging between two and three meters. A field of four hundred syphon wave generators would equal the power of a nuclear reactor. I feel a syphon wave generator with two meter pipes would be best in most applications.

What I claim as my invention is:

1. A Syphon Wave Generating device comprising:
   a. a generator pipe mounted about horizontal with a prop driven generator inside,
   b. one or more intake manifold pipes mounted about horizontal to the ocean and perpendicular to the oncoming waves connected near the center to one end of the said generator pipe,
   c. one or more exhaust manifold pipes mounted about horizontal to the ocean and about perpendicular to the oncoming waves and being near parallel to said intake manifold pipe connected near the center to the other end of said generator pipe,
   d. two or more intake pipes with a one way valve inside to allow the water to flow only upward, mounted vertically with one end extending below the water and the top end connected to the said intake manifold,
   e. two or more exhaust pipes with a one way valve inside to allow the water to flow only downward, mounted vertically with one end extending below the water and the top end connected to the said exhaust manifold pipe, whereby the momentum and weight of the moving water in one direction through the said intake manifold and out through the said exhaust manifold acts like a liquid flywheel to keep the generator spinning continuously.

2. A Syphon Wave Generating device comprising:
   a. a generator pipe mounted about horizontal with a prop driven generator inside,
   b. one or more intake manifold pipes mounted about horizontal to the ocean and perpendicular to the oncoming waves connected near the center to one end of the said generator pipe,
   c. one or more exhaust manifold pipes mounted about horizontal to the ocean and about perpendicular to the oncoming waves and being near parallel to said intake manifold pipe connected near the center to the other end of said generator pipe,
   d. two or more intake pipes with a one way valve inside to allow the water to flow only upward, mounted vertically with one end extending below the water and into the ocean floor and the top end connected to the said intake manifold pipe with one or more intake holes below the said one way valve,
   e. two or more exhaust pipes with a one way valve inside to allow the water to flow only downward, mounted vertically with one end extending below the water and into the ocean floor and the top end connected to the said exhaust manifold pipe, with one or more exhaust holes below said one way valves, whereby the said intake and said exhaust pipes would become the mounting posts that could withstand any storm.

3. The siphon wave generator defined in claim 2 wherein a service valve with means to remove air from the inside of the unit is mounted at the highest point of said generator pipe or said intake manifold pipe or said exhaust manifold pipe.

* * * * *